United States Patent

[11] 3,611,085

| [72] | Inventor | George M. Rosenberry, Jr. |
| --- | --- | --- |
| | | Elnora, N.Y. |
| [21] | Appl. No. | 87,118 |
| [22] | Filed | Nov. 5, 1970 |
| [45] | Patented | Oct. 5, 1971 |
| [73] | Assignee | General Electric Company |

[54] PREVENTING TORQUE PULSATION IN INVERTER-FED POLYPHASE
7 Claims, 4 Drawing Figs.

| [52] | U.S. Cl. | 318/225 R, |
| --- | --- | --- |
| | | 318/227, 318/230 |
| [51] | Int. Cl. | H02p 5/40 |
| [50] | Field of Search | 318/225, |
| | | 227, 230, 231 |

[56] References Cited
UNITED STATES PATENTS

| 2,215,156 | 9/1940 | Kovessi | 318/227 X |
| --- | --- | --- | --- |
| 2,693,561 | 11/1954 | Barrel | 318/227 |
| 3,289,062 | 11/1966 | Dannettell | 318/227 |
| 3,343,063 | 9/1967 | Kenney, Jr. et al. | 318/230 X |

*Primary Examiner*—Gene Z. Rubinson
*Attorneys*—John J. Kissane, James C. Davis, Jr., Frank L. Neuhauser, Oscar B. Waddell and Joseph B. Forman ABSTRACT: Separate sets of armature windings in a polyphase motor are individually supplied with square-wave alternating current from separate inverters. The inverter outputs are phase shifted with respect to one another and paralleling transformers are provided to average the line-to-line waveforms; or, in another embodiment, the windings are angularly displaced within the motor by an amount corresponding to the phase shift between the inverter outputs. The summing of the phase-shifted waveforms effects a cancellation of harmonic components which produce undesirable torque pulsations.

3,611,085

PREVENTING TORQUE PULSATION IN INVERTER-FED POLYPHASE

BACKGROUND OF THE INVENTION

The present invention relates to polyphase electric motors, and, more particularly, to polyphase motors having plural armature windings fed by diverse square wave inverter sources.

Polyphase motor systems in which power is supplied to the motor by an inverter have become increasingly popular in recent years, partially because motor speed control can be obtained by varying the frequency of the inverter output. However, many types of inverters, including some of the more commercially practical designs, provide voltage having a square-wave configuration. In the case of three-phase power, such a square wave contains strong fifth and seventh harmonic components. In a three-phase motor being supplied with power at a fundamental frequency $f$, the field created by the fifth harmonic voltage rotates backwards at a frequency of $6f$ with respect to the field generated by the fundamental voltage while the field created by the seventh harmonic voltage rotates forwardly at a frequency of $6f$ relative to the fundamental generated field. A variation in the rotating field thus occurs six times for every revolution of the fundamental-induced field pattern, with the result that the rotor of the machine experiences severe torque pulsations at a frequency of $6f$. At high frequencies, these pulsations are insignificant; but when frequency is decreased, they become quite severe and often operate as a limiting factor in determining the minimum frequency at which a given polyphase machine may be operated.

In many cases, it is desired to energize motor windings from inverters connected in parallel. However, any discrepancy in phase or voltage between the waveforms of such paralleled inverters results in unacceptably high circulating currents in the motor windings. In the past, the remedy for this problem, and the method for paralleling a plurality of inverters for motor energization, was to couple the inverters to the motor windings by means of a transformer. A plurality of in-phase inverters having waveforms of an acceptable configuration thus could be coupled together by means of the primary winding of the transformer, or a plurality of phase-displaced square wave inverters could be inductively coupled through a plurality of primary transformer windings; the sum of the phase-shifted square wave constituting an acceptable waveform and having a minimum of fifth and seventh harmonic components therein. Unfortunately, a major disadvantage inheres in this arrangement because the inductive coupling between the inverters and the motor becomes less and less efficient as frequency decreases. More specifically, the limitation on the low frequency capability of the foregoing arrangement results from the fact that the required volts per cycle of the motor increases with decreasing frequency whereas the transformer capability is constant volts per cycle.

SUMMARY OF THE INVENTION

The present invention allows the connection of a plurality of inverters to a polyphase motor without the necessity of utilizing a coupling transformer therebetween. Separate inverters may be coupled directly to electrically separated motor windings to avoid detrimental circulating currents between the windings. However, if the inverters produce a square wave voltage, the strong harmonic components will produce torque pulsations in the rotor. In order to eliminate such undesired torque pulsations in accordance with this invention, the inverters are phase-shifted relative to one another. The phase-shifted outputs then are directed through inductively coupled windings wherein they are averaged, or added, and the resulting waveform directed to the proper motor winding. The motor windings thus are provided with an AC voltage having a modified square waveform, eliminating the detrimental harmonics which would otherwise be present.

Another approach taught by the subject invention is to singularly displace sets of windings at angles corresponding to the phase shift of the supply inverters. If desired, paralleling transformers can be eliminated with this embodiment since, although square-wave signals containing the undesirable harmonics are supplied to each of the windings, the corresponding angular displacement of the windings causes the windings to induce torque pulsations which oppose one another and thus cancel. It is also possible to utilize paralleling transformers in this embodiment in order to average the square-wave voltages, depleting the harmonic content thereof and further enhancing the operation of the motor.

It is therefore an object of the present invention to provide a system for energizing a polyphase motor by a plurality of inverters, wherein no significant torque pulsations are produced by harmonic components of the supply voltage.

It is a further object to provide means for paralleling a plurality of inverters supplying power to a polyphase motor, wherein circulating currents between such inverters are prevented.

It is still a further object to provide means for supplying low-frequency power to a polyphase motor from a plurality of phase-shifted inverters, without inductively coupling the inverters to the motor.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawing in which:

DESCRIPTION OF THE PREFERRED EMBODIMENT

Figure 1:
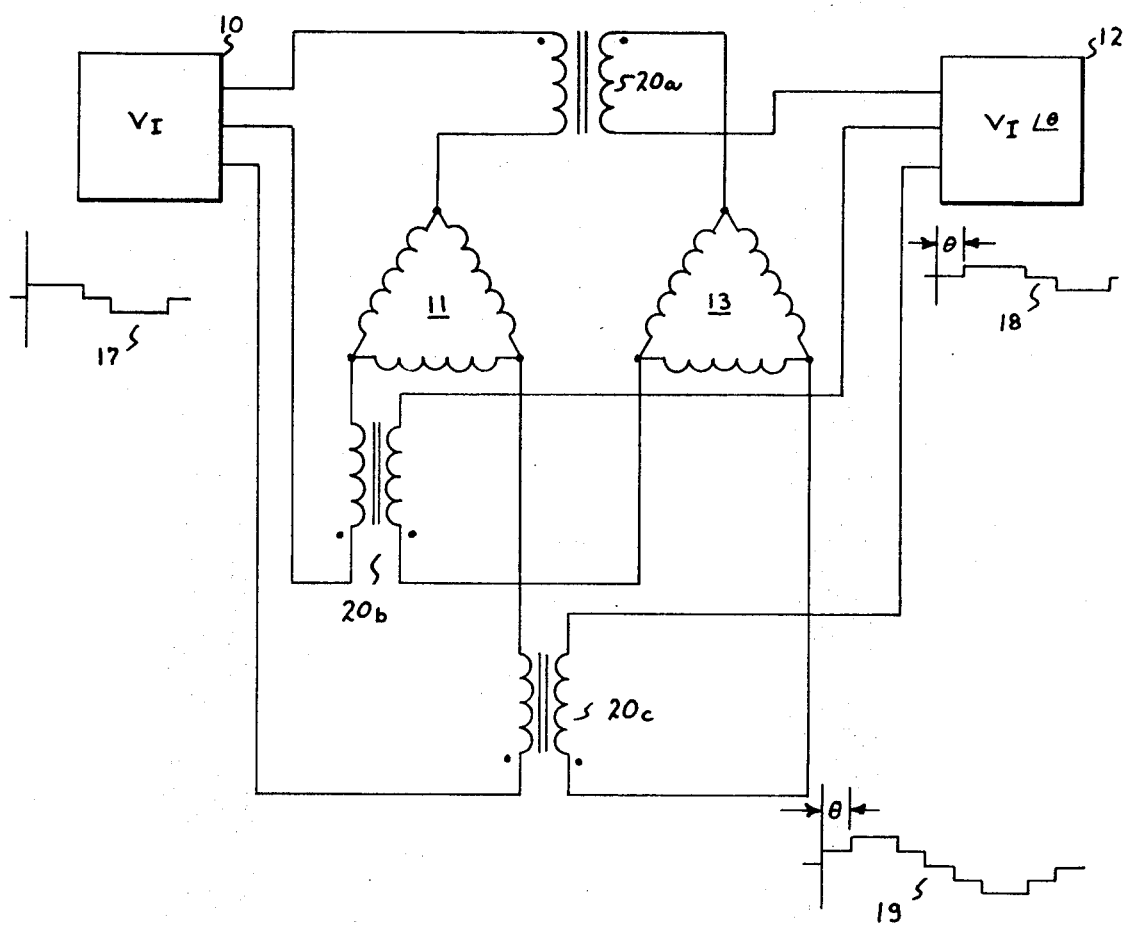
FIG. 1 is a schematic diagram of separate inverters supplying power to individual motor windings with paralleling transformers coupling corresponding phase conductors.

Referring now to FIG. 1, a pair of inverters 10 and 12 supply three-phase voltage $V_1$ to a pair of electrically separate windings 11 and 13. The pair of windings comprises the armature winding of a single polyphase motor, and thus may be to some extent inductively coupled. The coupling, however, is usually not such as to allow discrepancies in waveform or voltage magnitude to cause significant current to circulate between inverters 10 and 12. As illustrated by waveforms 17 and 18 (representing the line-to-line voltage outputs from inverters 10 and 12, respectively, applied to corresponding phase windings of motor windings 11 and 13), the output voltages generated by each inverter may be termed a three-phase square wave wherein the line-to-line alternating voltage has a fixed magnitude for 120° of each half cycle and a substantially instantaneous rise and fall. Such waveforms, while containing undesirably high fifth and seventh harmonic components, can be produced by equipment which is often less complex and expensive than that required to produce a "smoother," or more nearly sinusoidal, waveform. For this reason, it is often desired to use such inverters to drive polyphase machinery. Although inverters 10 and 12 both provide square-wave voltages having a common magnitude $V_1$, the line-to-line voltages generated by inverter 12 are phase-shifted at an angle $\theta$ with respect to the line-to-line voltages generated by inverter 10.

Paralleling transformers 20a, 20b, and 20c inductively couple corresponding phase conductors of each inverter to average the voltage waveforms generated by the inverters.

The inductive coupling, however, absorbs only the difference between the voltages and the coupling therefore is of small size and no barrier to boosting the volts per cycle at low frequency. The resulting averaged waveform is depicted at 19. "Leading" waveform 17 forms the initial "step" of resulting waveform 19, the wave reaching its maximum amplitude upon the occurrence of the leading edge of "lagging" waveform 18 after a lag of $\theta$. Similarly, when the magnitude of waveform 17 falls to zero, a trailing "step" is formed in waveform 19, the voltage returning to zero as lagging waveform 18 returns to zero. The "stepped" waveform, while not fully sinusoidal, is smoother in form than the pure square waves supplied by either inverter 10 or 12. The fifth and seventh harmonics are thereby substantially attenuated, with the result that the torque pulsation normally occurring at six times the fundamental frequency, or 6$f$, is substantially eliminated. As will be explained, by selecting a phase angle $\theta$ between the waveforms of corresponding phases of first and second inverters 10 and 12 of 30°, the torque pulsations can be eliminated. A six-times frequency phenomenon must, by definition, have a period one-sixth that of the normal waveform, or 60°. By shifting one of the component fundamental waveforms 30°, it will be seen that the 6$f$ phenomena created by the combined waveforms oppose, and thus cancel, since they are now in direct phase opposition to one another. While the general concept of providing phase-shifted inverted power and mixing the waveforms is known, it has heretofore been accomplished by applying the power to the primary of a transformer inductively coupling the entire power to the polyphase motor windings connected to the secondary of the transformer. As will be appreciated by those skilled in the art, at low frequencies the inductive coupling becomes severely attenuated, and the magnitude of the volts per cycle supplied to the motor windings cannot be increased to compensate for resistance losses. If the inverters are directly coupled to the polyphase windings, the desired low-frequency fundamental voltage will be transmitted directly to the motor windings but in the case where square-wave voltages are used, substantial fifth and seventh harmonics will be present and the ensuing torque pulsations will serve to limit the lowest frequency which may be utilized. It will be seen, however, that the present invention overcomes both of the aforementioned deficiencies by absorbing voltage differences between the inverters. Thus, paralleling transformers 20a, 20b and 20c, average the waveform, attenuating the dominant harmonic components thereof and eliminating the undesired torque pulsations. Further, the present circuit allows the inverters to be coupled directly to the phase windings, so that even extremely low-frequency voltages may be transmitted directly to the windings. The substantial elimination of the 6$f$ torque pulsations allows the polyphase motor to be operated at frequencies less than one-half those previously attainable since the dominant harmonic is now twice 6$f$, or 12$f$. While other frequency torque pulsations still occur, primarily the 12$f$ pulsation, such pulsations are of a far lower magnitude than these occurring at 6$f$, and are more easily tolerated.

Figure 2:
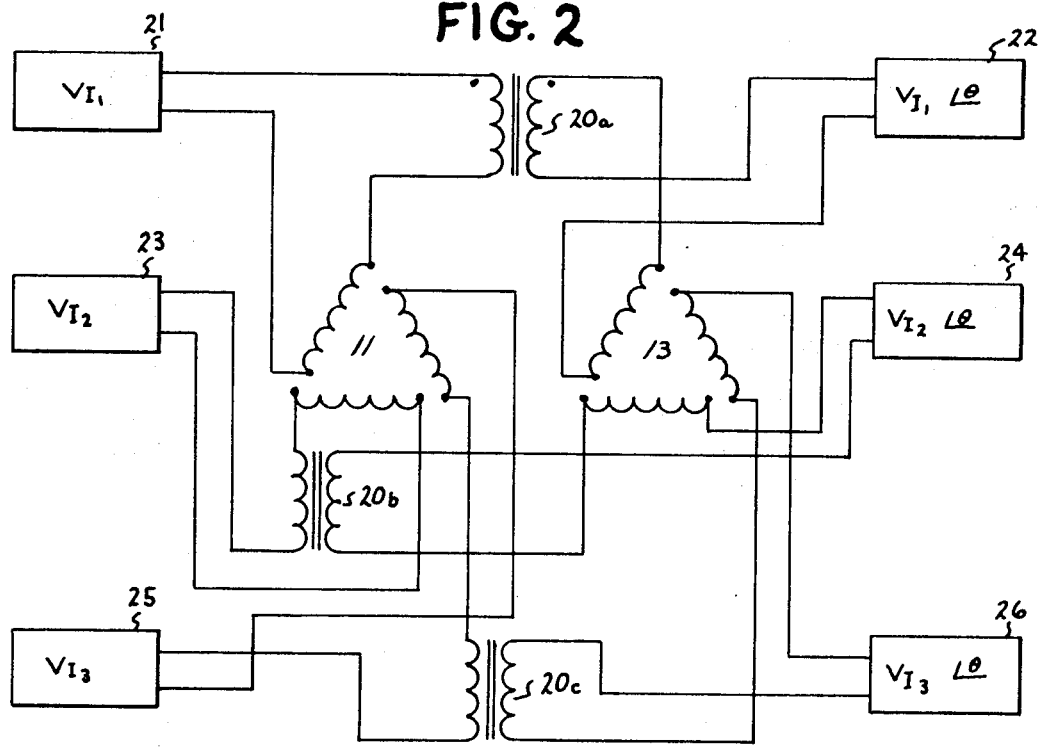
FIG. 2 illustrates a polyphase motor having dual sets of electrically separated phase windings wherein each phase winding is supplied by a separate inverter.

A further embodiment of the invention is shown in FIG. 2 wherein three-phase winding 11 and 13 are supplied with power by two sets of inverters. The first of the sets comprises inverters 21, 23, 25, each inverter providing single-phase voltages $V_I$, $v_l$ and $V_I$ to energize an electrically isolated phase of polyphase winding 11. Similarly, inverters 22, 24 and 26 each provide corresponding single-phase voltages $V_I$, $V_I$ and $V_{II}$ to an electrically separate phase of polyphase winding 13. Voltage supplied by any inverter of each set is phase-shifted 120° with respect to the other voltages of the set, so that each set of inverters may be regarded as supplying three-phase power. The voltages supplied by the second set of inverters are displaced an angle $\theta$ with respect to corresponding voltages supplied by the first set, and paralleling transformers 20a, 20b, 20c are provided to "average" the waveforms supplied by corresponding inverters of each set. As described above, the angle $\theta$ may advantageously be 30°. The net result is to provide a "stepped" waveform, such as that depicted at 19 of FIG. 2, which substantially eliminates the unwanted harmonic components, and the resulting torque pulsations. A plurality of small, economical inverters can be utilized affording greater reliability than if a single pair of inverters were used; further, the electrical isolation of each phase of each winding eliminates unwanted circulating currents caused by voltage or phase variations between signals supplied by the various inverters.

Figure 3:
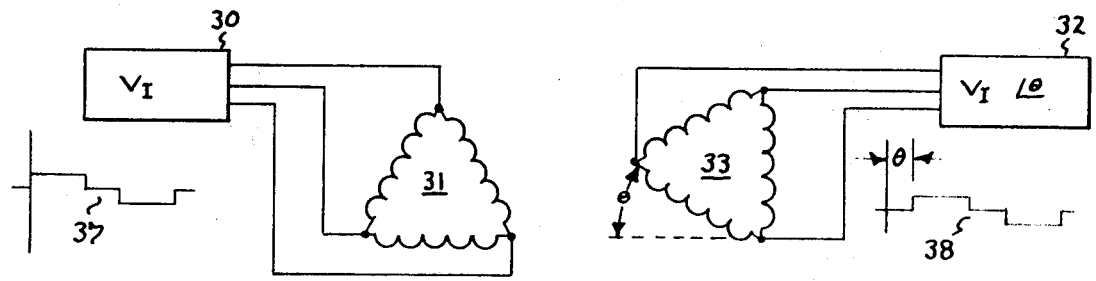
FIG. 3 is a schematic diagram of a pair of phase-shifted inverters connected for supplying power to a pair of separate, angularly-displaced polyphase motor windings.

Referring now to FIG. 3, a further embodiment of the present invention is illustrated wherein a pair of inverters 30 and 32 are provided, inverter 32 supplying polyphase voltage $V_I$ at a phase angle of $\theta$ with respect to the voltage $V_l$ supplied by inverter 30. As was the case in previous embodiments, $\theta$ may be substantially 30°. Inverters 30 and 32 supply power to a pair of electrically separate polyphase windings 31 and 33 of a common machine. Polyphase winding 33 is angularly displaced within the machine relative to polyphase winding 31 by the same angle $\theta$ at which the polyphase power supplied by inverter 32 is shifted relative to that supplied by inverter 31. This result can be advantageously achieved in a three-phase motor by dividing the usual 60° phase belt into two halves and using the first half of each phase belt for winding 31 and the second half of each phase belt for winding 33 to obtain the desired 30° displacement between windings. In the case of the illustrated embodiment, no paralleling transformers are needed to absorb differences between the output voltage waveforms of inverters 30 and 32, illustrated at 37 and 38, respectively. The harmonic components of these waveforms therefore are not attenuated, the waveform being transmitted directly to the sets of windings 31 and 33. Nonetheless, by shifting the relative phase of the inverted power, and shifting the windings to which such power is transmitted by a similar angle with respect to the other phase windings, the major torque pulsations are cancelled. As set forth above, cancellation of the torque pulsations may be accomplished by shifting the phase of power supplied by one of the inverters, and shifting the windings connected thereto by a similar amount in order to produce mutually cancelling 6$f$ phenomena. If three inverters were utilized, for instance, along with three sets of polyphase windings, the necessary phase shift, and thus the necessary angular shift of the windings, then need only be one-third of 60°, or 20°. Since the period of the torque pulsations is one-sixth that of the fundamental, or 60°, one need only divide 60° by the number of power sources in order to find the phase shift necessary to produce cancellation between the torque pulsations which each source tends to produce. In the embodiment shown in FIG. 3, the fifth and seventh harmonics are still present in the waveforms supplied to each winding and create rotating fields which tend to induce torque pulsations at 6$f$. The offsetting effect from the angularly shifted winding however tends to produce torque pulsations with the same frequency but with opposite phase and the torque pulsations tend to cancel.

Figure 4:
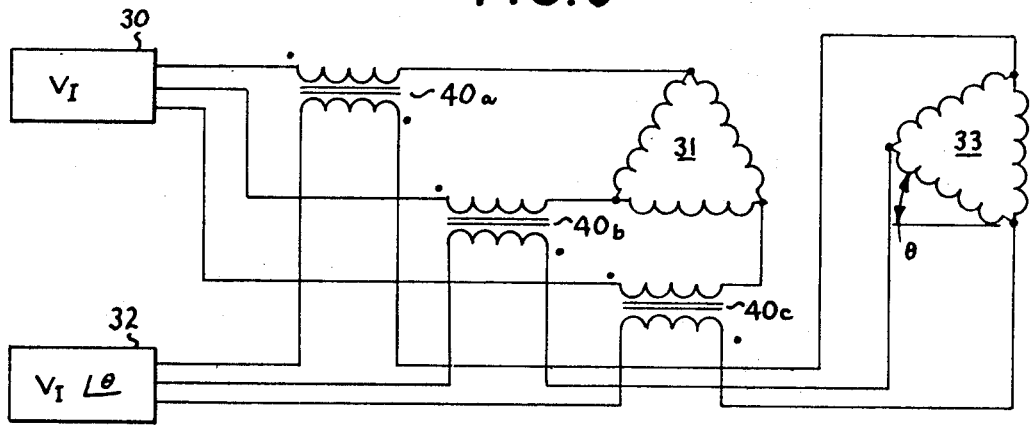
FIG. 4 shows a pair of phase-shifted inverters connected for supplying power to separate, angularly-displaced motor windings, with paralleling transformers coupling square-wave phase conductors.

FIG. 4 depicts a further embodiment of the subject invention wherein first and second inverters 30 and 32 provide square wave, polyphase power to separate polyphase windings 31 and 33. Voltage $V_I$ supplied by inverter 32 is phase shifted by an angle of $\theta$, which may be 30°, with respect to that supplied by inverter 30 and phase windings 33 are disposed at a similar angle with respect to windings 3. In addition, paralleling transformers 40a, 40b, and 40c inductively couple corresponding ones of the phase conductors connecting inverters 30 and 32 to their respective windings to absorb voltage differences between the inverters. Unlike the embodiment IN FIG. 1 above, the paralleling transformers 40a–40c do not have to support the fundamental voltage difference between the waveforms of the two inverters. The inductive coupling does, however, serve to remove the unwanted harmonic components from the fundamental waveforms of each phase, further nullifying those components which produce the unwanted torque pulsations.

As will be evident from the foregoing description, certain aspects of the invention are not limited to the particular details of construction of the examples illustrated and it is therefore contemplated that other modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. Means for energizing a polyphase electric motor having a plurality of electrically isolated polyphase windings, comprising:
 a plurality of polyphase inverters, each inverter being adapted to directly supply phase displaced power to different ones of said polyphase windings; and
 means for inductively coupling conductors carrying current developed by corresponding phases of said polyphase inverters to absorb voltage differences between the inverters.

2. Energizing means as defined in claim 1, wherein successive ones of said polyphase windings are angularly displaced with respect to the preceding winding by an angle defined by the expression
$$60/n$$
where $n$ is the number of said polyphase windings.

3. A polyphase motor system, comprising:
 first and second polyphase windings, each phase of each of said windings being electrically isolated from the other phases of said winding;
 first and second sets of inverters, each of said sets comprising one single-phase inverter for each of the phases of each of said polyphase windings, each inverter supplying power directly to a separate phase of each of said windings, one of said inverters of said second set developing alternating current having a phase angle relative to corresponding ones of said inverters of said other set of inverters defined by the expression
$$60/n$$
where $n$ is the number of said windings;
 means for connecting said inverters to said windings; and
 means for inductively coupling connecting means which conduct current to corresponding phases of said windings for combining the waveforms of the currents supplied over said windings to absorb voltage differences between said waveforms.

4. A polyphase motor system as defined in claim 3 wherein said plurality of polyphase windings comprise two three-phase windings, and said plurality of sets of inverters comprise two sets of three single-phase inverters.

5. A polyphase motor system, comprising:
 a motor having a plurality of electrically separate polyphase windings, each of said windings being disposed at an angle to others of said windings within said motor; and
 a plurality of inverters, each of said inverters supplying polyphase power directly to a different one of said polyphase windings, the output of each of said inverters being phase-shifted with respect to the output of each of said other inverters by an amount equivalent to the angular displacement of its respective windings, said angle and being represented by the expression
$$60/n$$
where $n$ is the number of said plurality of said polyphase windings.

6. The motor supply system as defined in claim 5 further including means for inductively coupling the respective phases of said inverters to absorb voltage differences therebetween.

7. A polyphase motor system, comprising:
 a motor having a plurality of polyphase windings,
 a plurality of inverters supplying polyphase power directly to a different one of said polyphase windings, the polyphase output power of each inverter being phase-shifted with respect to the output power of said other inverters by an amount equal to
$$60/n$$
wherein $n$ is the number of said plurality of polyphase windings; and
 means inductively coupling the conductors carrying current from each inverter to corresponding phases of said polyphase windings to absorb voltage differences therebetween.